(12) United States Patent
Agrawal et al.

(10) Patent No.: US 8,898,095 B2
(45) Date of Patent: *Nov. 25, 2014

(54) SYSTEMS AND METHODS TO FACILITATE LOCAL SEARCHES VIA LOCATION DISAMBIGUATION

(71) Applicant: AT&T Intellectual Property I, L.P., Atlanta, GA (US)

(72) Inventors: Ritesh Jitendra Agrawal, Fremont, CA (US); James G. Shanahan, San Francisco, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,750

(22) Filed: Jun. 24, 2013

(65) Prior Publication Data

US 2013/0290227 A1   Oct. 31, 2013

Related U.S. Application Data

(63) Continuation of application No. 12/939,898, filed on Nov. 4, 2010, now Pat. No. 8,473,433.

(51) Int. Cl.
  *G06F 15/18* (2006.01)
  *G06F 17/30* (2006.01)
  *G06N 99/00* (2010.01)

(52) U.S. Cl.
  CPC .......... *G06F 15/18* (2013.01); *G06F 17/30241* (2013.01); *G06N 99/005* (2013.01)
  USPC ............................................................ 706/12

(58) Field of Classification Search
  CPC .. G06F 15/18; G06F 17/30241; G06N 99/005
  USPC ............................................. 706/12; 707/711
  See application file for complete search history.

(56) References Cited

U.S. PATENT DOCUMENTS

| | | | |
|---|---|---|---|
| 2007/0061301 A1* | 3/2007 | Ramer et al. | 707/3 |
| 2007/0061302 A1* | 3/2007 | Ramer et al. | 707/3 |
| 2007/0061332 A1* | 3/2007 | Ramer et al. | 707/10 |
| 2007/0198485 A1* | 8/2007 | Ramer et al. | 707/3 |
| 2007/0233864 A1* | 10/2007 | Xie et al. | 709/226 |
| 2008/0243821 A1* | 10/2008 | Delli Santi et al. | 707/5 |
| 2009/0132236 A1* | 5/2009 | Kislyuk et al. | 704/9 |
| 2009/0132485 A1* | 5/2009 | Reed et al. | 707/3 |
| 2009/0132511 A1* | 5/2009 | Yang et al. | 707/5 |

(Continued)

OTHER PUBLICATIONS

Smith, David A., et al., "Bootstrapping toponym classifiers," Center for Language and Speech Processing, Computer Science Department, Johns Hopkins University, 5 pages.

(Continued)

*Primary Examiner* — Jeffrey A Gaffin
*Assistant Examiner* — Dave Misir
(74) *Attorney, Agent, or Firm* — Hartman & Citrin LLC

(57) ABSTRACT

Systems and methods use machine learning techniques to resolve location ambiguity in search queries. In one aspect, a dataset generator generates a training dataset using query logs of a search engine. A training engine applies a machine learning technique to the training dataset to generate a location disambiguation model. A location disambiguation engine uses the location disambiguation model to resolve location ambiguity in subsequent search queries.

16 Claims, 3 Drawing Sheets

(56) References Cited

U.S. PATENT DOCUMENTS

| | | | | |
|---|---|---|---|---|
| 2009/0132513 | A1* | 5/2009 | McKee et al. | 707/5 |
| 2009/0132644 | A1* | 5/2009 | Frishert et al. | 709/203 |
| 2009/0132645 | A1* | 5/2009 | Yang et al. | 709/203 |
| 2009/0132953 | A1* | 5/2009 | Reed et al. | 715/781 |
| 2009/0144609 | A1* | 6/2009 | Liang et al. | 715/230 |
| 2009/0265328 | A1* | 10/2009 | Parekh et al. | 707/5 |

OTHER PUBLICATIONS

Joshi, Tanuja et al., "Crosslingual Location Search," Microsoft Research India, Microsoft India R&D, 8 pages.

Sanderson, M., et al., "Analyzing geographic queries," Proceedings of the Workshop on Geographic Information Retrieval (SIGIR), (2004).

Jones, Rosie et al, "Geographic Intention and Modification in Web Search," International Journal of Geographical Information Science, vol. 00, No. 00, Jul. 2004, pp. 1-20.

Zhang, Vivian Wei et al., "Geomodificiation in Query Rewriting," Yahoo! Research, pp. 5.

Guillen, Rocio, "GeoParsing Web Queries," CLEF 2007, LNCS 5152, 2008, pp. 781-785.

Martins, Bruno et al., "Handling Locations in Search Engine Queries," GIR, Aug. 10, 2006, pp. 6.

Fu, Gaihua et al., "Ontology-based Spatial Query Expansion in Information Retrieval," School of Computer Science, Caridff University, Cardiff, United Kingdom, pp. 16.

Andogah, Geoffrey et al., "Placename Ambiguity Resolution," Alfa Informatica, University Groningen, The Netherlands, pp. 7.

Sengar, Vibhuti, "Robust Location Search Text Queries," Microsoft Research India, ACMGIS'07, Nov. 7-9, 2007. pp. 8.

Delboni, Tiago M., et al., "Semantic Expansion of Geographic Web Queries Based on Natural Language Positioning Expressions," Transactions in GIS, 2007, vol. 11, No. 3, pp. 377-397.

Hastie. Trevor et al., "The Elements of Statistical Learning: Data Mining, Interference, and Prediction" Second Edition, Feb. 2009, pp. 763.

Leidner, Jochen L., et al., Toponym Resolution in Text: "Which Sheffield is it?" SIGIR 2004, University of Edinburgh, School of Informatics, Edinburgh, Scotland, pp. 4.

Volz, Raphael et al., "Towards ontology-based disambiguation of geographical identifiers," WWW2007, Mar. 8-12, 2007, Banff, Canada, pp. 7.

Burges, C., et al., "Learning to rank using gradient descent," Proceedings of the 22nd International Conference on Machine Learning, ACM (2005), pp. 89-96.

Buscaldi, D., et al., "A conceptual density-based approach for the disambiguation of toponyms," International Journal of Geographical Information Science 22, 3 (2008), pp. 301-313.

Chen, Y., et al., "Efficient query processing in geographic web search engines," Proceedings of the 2006 ACM SIGMOD International Conference on Management of Data, ACM (2006), pp. 277-288.

Friedman, J.H., "Greedy Function Approximation: A Gradient Boosting Machine," The Annals of Statistics 29, 5 (2001), pp. 1189-1232.

Friedman, J.H., et al., "Stochastic gradient boosting," Mar. 26, 1999, pp. 10.

Jenhani, 1., et al., "Decision trees as possibilistic classifiers," International Journal of Approximate Reasoning 48, 3 (2008), pp. 784-807.

Kauppinen, T. et al., "Ontology-based disambiguation of spatiotemporal locations," Proceedings of the 1st International Workshop on Identity and Reference on the Semantic Web (IRSW2008), 5th European Semantic Web Conference, (2008).

Leidner, J.L., "Toponym Resolution in Text: Annotation, Evaluation and Applications of Spatial Grounding of Place Names," Dissertation. Com, 2008.

Li. H.. et al.. "InfoXtract location normalization: a hybrid approach to geographic references in information extraction." Proceedings of the HLT-NAACL 2003 Workshop on Analysis of Geographic References—vol. 1, Association for Computational Linguistics (2003), pp. 39-44.

Overell, S., et al., "Place disambiguation with co-occurrence models," In A. Nardi, C. Peters and J. Vicedo, eds., CLEF 2006 Workshop, Working Notes. 2006.

Overell, S., et al., "Geographic co-occurrence as a tool for gir," Proceedings of the 4th ACM Workshop on Geographical Information Retrieval, ACM (2007), pp. 71-76.

Andogah, Geoffrey et al., "Geographical Scope Resolution," Alia Informatica, University Groningen, The Netherlands, pp. 7.

Agrawal R. et al., "Location Disambiguation in Local Searches Using Gradient Boosted Decision Trees", ACM SIGSPATIAL, San Jose, CA, USA, pp. 129-136, 2010.

U.S. Office Action dated Oct. 26, 2012 in U.S. Appl. No. 12/939,898.

U.S. Notice of Allowance dated Feb. 28, 2013 in U.S. Appl. No. 12/939,898.

\* cited by examiner

SYSTEMS AND METHODS TO FACILITATE LOCAL SEARCHES VIA LOCATION DISAMBIGUATION

CROSS-REFERENCE TO RELATED APPLICATIONS

This application is a continuation of, and claims priority to, U.S. patent application Ser. No. 12/939,898, entitled "Systems and Methods to Facilitate Local Searches via Location Disambiguation," filed Nov. 4, 2010, now issued U.S. Pat. No. 8,473,433, which is incorporated herein by reference in its entirety.

FIELD OF THE TECHNOLOGY

At least some embodiments of the disclosure relate to location disambiguation in general and more particularly, but not limited to, location disambiguation for search engines.

BACKGROUND

An unambiguous location reference can be uniquely located. An ambiguous location reference corresponds to more than one location. For example, the term "Springfield" by itself can refer to 30 different cities in the USA. While "Springfield" is an ambiguous location, "Springfield, Ill., USA" is an unambiguous location reference.

The location disambiguation problem has been studied in the context of large textual documents. Benefiting from the broader context that can be derived from the neighboring text, prior methods for location disambiguation in the context of large textual documents often use ad-hoc rules.

For example, H. Li, R. K. Srihari, C. Niu, and W. Li ("InfoXtract Location Normalization: A Hybrid Approach to Geographic References in Information Extraction," Proceedings of the HLT-NAACL 2003 Workshop on Analysis of Geographic References, Volume 1, Association for Computational Linguistics, 2003, pp. 39-44) assume "one sense per discourse," in that subsequent mention of a location reference can be identified with the first unambiguous location reference.

Similarly, G. Andogah, G. Bouma, J. Nerbonne, and E. Koster ("Geographical Scope Resolution," Methodologies and Resources for Processing Spatial Language, 2008) use spatial proximity as a criterion for disambiguating ambiguous location references, which assumes that "places of the same type or under the same administrative jurisdiction or near/adjacent to each other are more likely to be mentioned in a given discourse."

Alternatives to these rule-based approaches are topological and ontological based approaches, which benefit from certain inherent properties of an unambiguous location reference.

For example, an unambiguous location reference is a composite of various geographic entities (e.g., city, state, country, etc.) that are present at different geographic scales. In the example of "Springfield, Ill., USA," there are three geographic entities, which are "Springfield," "Ill.," and "USA." These entities exhibit a containment relationship in a way that the city Springfield is located in the state of IL and IL is located in the USA.

Based on this insight, V. Sengar, T. Joshi, J. Joy, S. Prakash, and K. Toyama ("Robust Location Search from Text Queries," Proceedings of the 15th Annual ACM International Symposium on Advances in Geographic Information Systems, ACM, 2007, pp. 1-8) formalize the problem of location disambiguation as the challenge of finding a region that is a spatial intersection of all the geographic entities present in a given location reference. For example, consider the location reference of "Mission Street, San Francisco." This location reference has two parts, i.e. "Mission Street" and "San Francisco," which have separate representations in a geographic database. Each of the above entities will lead to many possible geographic entities. However, in the best-case scenario, the spatial intersection of all these possible entities will only lead to a single intended region.

B. Martins, M. J. Silva, S. Freitas, and A. P. Afonso ("Handling Locations in Search Engine Queries," Proceeding of the 3rd ACM Workshop on Geographic Information Retrieval, 2006) and R. Volz, J. Kleb, and W. Mueller ("Towards Ontology-Based Disambiguation of Geographic Identifiers," Proceedings of 16th International Conference on World Wide Web, 2007) use approaches that model the location disambiguation problem as one of finding a single branch that contains all the geographic entities mentioned in a given location reference and thus use geographical ontology, instead of topological operations, to find the intended location. G. Fu, C. B. Jones, and A. I. Abdelmoty ("Ontology-Based Spatial Query Expansion in Information Retrieval," In Lecture Notes in Computer Science, Volume 3761, On the Move to Meaningful Internet Systems: Odbase, 2005, pp. 1466-1482) and T. Kauppinen, R. Henriksson, R. Sinkkilä, R. Lindroos, J. Väätäinen, and E. Hyvonen ("Ontology-Based Disambiguation of Spatiotemporal Locations," Proceedings of the 1st International Workshop on Identity and Reference on the Semantic Web (IRSW2008), 5th European Semantic Web Conference, 2008) provide further examples.

There are several challenges with the topological and ontological approaches. One challenge is that the operation of breaking a location reference into its constituent geographic entities is a combinatorial explosion problem. I. Jenhani, N. B. Amor, and Z. Elouedi ("Decision Trees as Possibilistic Classifiers," International Journal of Approximate Reasoning Vol. 48, No. 3, 2008, pp. 784-807) address this challenge to some extent.

However, there is another challenge when location references are incomplete (such as "San Jose" or "Springfield"), such that there are multiple spatial regions or ontological branches corresponding to a location reference. Some approaches use ad-hoc heuristic rules to rank these competing locations, such as in R. Volz, J. Kleb, and W. Mueller ("Towards Ontology-Based Disambiguation of Geographical Identifiers," Proceedings of 16th International Conference on World Wide Web, 2007), which rank competing ontological branches based on certain empirically decided weights that are based on structural features (such as feature class, population, etc.) that are available in a geographic gazetteer.

An alternate to such rule-based approaches is in D. A. Smith and G. S. Mann ("Bootstrapping Toponym Classifiers, " Proceedings of the HLT-NAACL 2003 Workshop on Analysis of Geographic References—Volume 1, Association for Computational Linguistics, 2003, pp. 45-49), which proposes a data-driven place name classifier that is trained and tested on news articles and historical documents.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
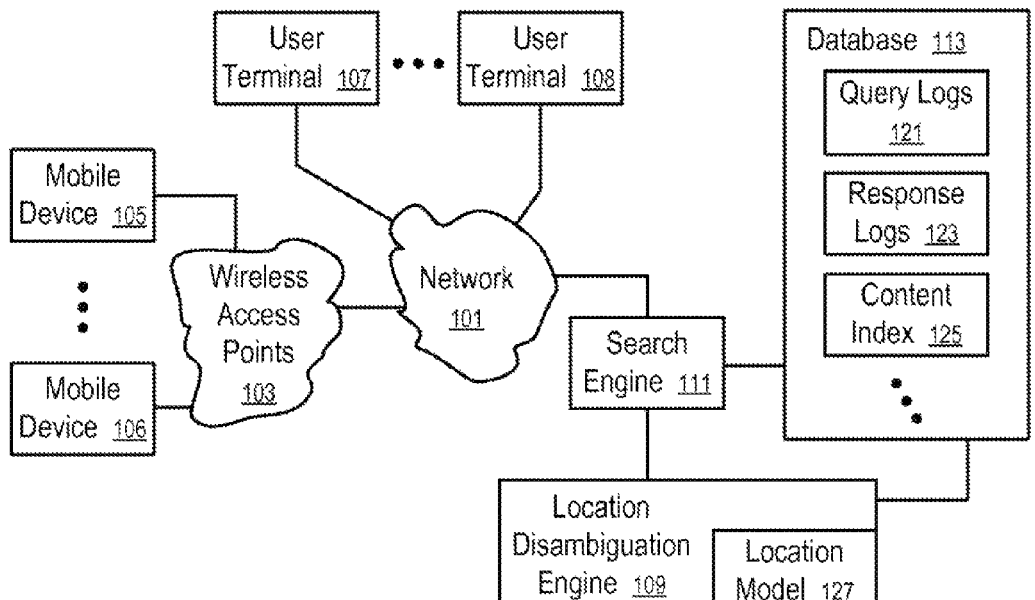
FIG. 1 shows a system to provide local searches according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and separate or alternative embodiments are not mutually exclusive of other embodiments. Moreover, various features are described which may be exhibited by some embodiments and not by others. Similarly, various requirements are described which may be requirements for some embodiments but not other embodiments.

Local queries, or local searches, such as "pizza but in Glendale, Calif.," "Chinese restaurant near golden gate bridge," etc., are geographically constrained searches. For example, a search engine in one embodiment is configured to search a structured database for information such as local business listings, advertisements, news, articles, events, etc.

Typical local search queries include not only topic information about "what" the site visitor is searching for (such as keywords, a business category, or the name of a consumer product) but also location information about "where," such as a street address, city name, postal code, or geographic coordinates like latitude and longitude. Examples of local searches include "plumbers in one valley," "Manhattan restaurants," etc.

Uniquely locating the referred geographical constraint on the surface of the Earth and thus determining the geographical intent of the query helps to address local queries effectively. However, geographical constraints in local queries are often incomplete and therefore suffer from the problem of location ambiguity, where the same location reference leads to many different possible locations.

For example, consider a local search for "Italian restaurants in Springfield," where the term "Springfield" by itself can refer to 30 different cities in the USA. Without any other contextual information, this search can relate to "Springfield, Ill.," "Springfield, Mo.," or other "Springfield."

In one embodiment, a method and system use a formalized data-driven approach for location disambiguation in local searches. One embodiment of the disclosure provides location models for the determination of the geographic intent of local queries or searches. At least one embodiment in the present disclosure provides systems and methods to use gradient boosted decision trees for location disambiguation in local searches.

In one embodiment, the method and system use machine learning techniques, such as gradient boosted decision trees, to build and train location models based on contextual features and/or non-contextual features.

In one embodiment, the method and system provide location disambiguation for local searches in different search environments, such as mobile searches (e.g., search requests from mobile devices) and desktop searches (e.g., search requests from non-mobile devices having fixed locations).

In one embodiment, the method and system not only improve geographic retrieval performance but also provide insight into the relative influence of various features for location disambiguation in different search environments.

Heuristics based systems to disambiguate locations in large textual documents, such as a webpage, a Wikipedia article or a news article, may not be suitable for location disambiguation in local searches. For example, ad-hoc rules of such systems may be subject to the limitation of the intuition of their designers. Even ontological and topological based systems involve ad-hoc rules to address multiple competing location possibilities.

Ad-hoc rules are subject to the limitation of the experience and intuitions of the developer, and are often situation dependent. For example, rules designed to help disambiguate locations in desktop-based local searches might not be applicable to mobile-based local searches.

Further, while location disambiguation in large textual documents benefits from the wider context that can be derived from neighboring words, sentences and other unambiguous location references in the text, such context information is typically absent in local searches. Large textual documents can provide useful clues from other location references in the text for the disambiguation of a given ambiguous location reference. However, local searches are usually very short. For example, M. Sanderson and J. Kohler ("Analyzing Geographic Queries," Proceedings of the Workshop on Geographic Information Retrieval (SIGIR, 2004)) indicate that the average number of words per local query is about 3.3. As a result, disambiguation algorithms for local searches do not have access to the contextual information that can be derived from a large body of text.

In one embodiment, a location disambiguation system and method use a systematic, formalized and data-driven approach. The system uses machine learning techniques, such as generalized linear models or gradient boosted decision trees, to build location models from data recorded from prior searches.

In one embodiment, the location disambiguation system uses various features from the local search query log of a search engine and/or features from other resources, such as geographic databases and gazetteers, the US Census, etc., to train the location models using machine learning techniques.

One embodiment of the disclosure uses a pair-wise machine learning technique in training the location model. Another embodiment of the disclosure uses a point-wise machine learning technique in training the location model. C. Burges, T. Shaked, and E. Renshaw ("Learning to Rank Using Gradient Descent," Proceedings of the 22nd International Conference on Machine Learning, ACM, 2005, pp. 89-96) provide details about a point-wise machine learning technique, the disclosure of which is incorporated herein by reference.

The systems and methods according to embodiments presented in this disclosure have advantages over the past approaches. For example, the systems and methods according to embodiments presented in this disclosure are not based on ad-hoc, a priori, heuristic rules. The systems and methods according to embodiments presented in this disclosure use a machine learning technique to automatically generate the decision rules based on training data. Further, the systems and methods according to one embodiment incorporate features that cause a search to provide different results based on the current locations of the searchers and other contextual information, such as past searches, to provide personalized resolution of ambiguous locations. Thus, the same location reference (such as Springfield) might resolve to two different locations (such as Springfield, Ill. and Springfield, Mo.) in two different user contexts.

One embodiment of the system and method has been implemented and tested within a lab environment. In comparison to a rule based system, this implementation reduces error rate by almost 9% in the case of desktop-based local searches and 22% in the case of mobile-based local searches. Further, the decision tree of the location model implemented in the lab environment shows the relative influence of various geographic and non-geographic features for location disambiguation. While the location model confirms that the distance between the user and the intended location is an important variable for location disambiguation, the location model shows that the relative influence of such a distance is secondary to an indicator of the popularity of the location in the location model.

Often geographic distance has been considered to be the most important feature in location searches, especially in the context of mobile-based local searches. For example, R. Jones, W. V. Zhang, B. Rey, P. Jhala, and E. Stipp ("Geographic Intention and Modification in Web Search," International Journal of Geographic Information Science, Vol., 22, No. 3, 2008, pp. 229-246) characterize local searches based on geographic distance between the user and their intended search location. Such studies focus on the geographic distance independent of other contextual features such as popularity, population, etc. of the candidate location.

The location model implemented and tested within the lab environment provides insights into the influence of various features. The knowledge obtained from inspecting the location model can improve heuristic-rule based systems. For example, the location model shows that the parameter of raw search hit value of a location candidate has more influence than other parameters, such as the distance between the searcher and the location candidates. The raw search hit value, obtained by submitting the location candidate to a search engine to obtain a count of items identified by the search engine to be relevant to the location candidate, appears to capture the notion of popularity of a geographic entity. Additionally, in contrast to the general belief that the distance between the searcher and the location candidate is the most important parameter in the context of a mobile search environment, the location model implemented and tested within the lab environment shows that the distance is secondary to raw search hit value in both a mobile search environment and a desktop search environment.

However, relative influences do not provide the complete picture. The decision tree of the location model implemented and tested within the lab environment provides improved understanding of the role of different parameters. In the location model implemented and tested within the lab environment, the distance provides the first level of decision about whether a given candidate location is correct or not. This correlates with the general intuition that distance plays a major role in local searches. However, at the lower levels of both the decision trees, raw search hit value becomes a major feature in deciding relevance of a given candidate location.

FIG. 1 shows a system to provide local searches according to one embodiment. In FIG. 1, a search engine (111) receives search queries from user terminals (107, . . . , 108) and mobile devices (105, . . . , 106) via the network (101) and the wireless access points (103). The search engine (111) has a database (113) that stores content index (125). The search engine (111) uses the content index (125) to generate search results responsive to the search queries.

In one embodiment, the search engine (111) accepts search queries that have location ambiguities. A location disambiguation engine (109) communicates with the search engine (111) and uses a location model (127) to resolve the location ambiguities in the search queries for the search engine (111). In some embodiments, the location disambiguation engine (109) is part of the search engine (111). In some embodiments, the location disambiguation engine (109) is distinct and separate from the search engine (111).

In one embodiment, the search engine (111) is to record search queries in query logs (121) in the database (113).

In one embodiment, the search engine (111) is to further record user interaction with the search results in response logs (123) in the database (113). In one embodiment, the response logs (123) provide information confirming the search intent of the queries. For example, when the user or the searcher selects a business from the search result, the selection indicates that the location of the business corresponds to the geographical intent of the query.

In one embodiment, the location disambiguation engine (109) generates the location model (127) based on the query logs (121) and the response logs (123) of the search engine (111), or similar data from another search engine or a plurality of search engines.

In one embodiment, the location disambiguation engine (109) further submits queries to the search engine (111) (or another search engine) and obtains search results (e.g., search hits of an unambiguous location reference) for location disambiguation.

In one embodiment, a user terminal (e.g., 107 or 108) or mobile device (e.g., 105 or 106) is a data processing system, such as a notebook computer, a personal computer, a workstation, a network computer, a personal digital assistant (PDA), a mobile phone, a cellular phone, microprocessor-based or programmable consumer electronics, and the like.

In one embodiment, a user terminal (e.g., 107 or 108) has a substantially fixed location and thus is a non-mobile device. For example, a user terminal (e.g., 107 or 108) may be desktop computer. For example, in one embodiment, the IP address of the user terminal (e.g., 107 or 108) corresponds to a geographical location of the user terminal (e.g., 107 or 108).

In one embodiment, a mobile device (e.g., 105 or 106) has a location determination device, such as a Global Positioning System (GPS) receiver, to determine and report its location. Alternatively, a cellular communications system determines the location of the mobile device (e.g., 105 or 106) for the mobile device.

In one embodiment, when a searcher submits a search query from a user terminal (e.g., 107 or 108) or a mobile device (e.g., 105 or 106), the location of the user terminal (e.g., 107 or 108) or mobile device (e.g., 105 or 106) indicates the location of the user. The search engine (111) stores the location of the searcher with the corresponding query in the query logs (121) and/or provides the location of the searcher to the location disambiguation engine (109) to resolve location ambiguity.

Figure 2:
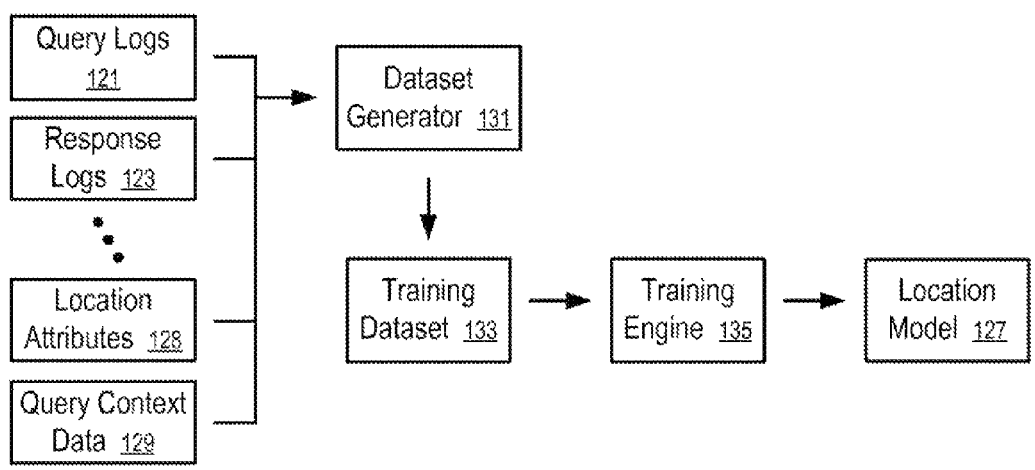
FIG. 2 shows a method and system to generate a location model according to one embodiment.

FIG. 2 shows a method and system to generate a location model according to one embodiment. In FIG. 2, a dataset generator (131) and a training engine (135) generate the location model (127) from input data such as query logs (121), response logs (123), location attributes (128) and query context data (129) in an automated way.

In FIG. 2, the dataset generator (131) generates a training dataset (133); and the training engine (135) uses the training dataset (133) to establish the location model (127) for the location disambiguation engine (109) using a machine learning technique.

In one embodiment, the dataset generator (131) computes the values of training variables of the training dataset (133) from the input data such as query logs (121), response logs (123), location attributes (128) and query context data (129).

In one embodiment, the location attributes (128) include features of locations that are independent of search queries recorded in the query logs (121).

In one embodiment, the query context data (129) includes features related to the context of the search queries recorded in the query logs (121), such as the locations of the searchers, locations of businesses selected by the searchers prior to the submission of the search queries, interests of the searchers, etc.

Figure 3:
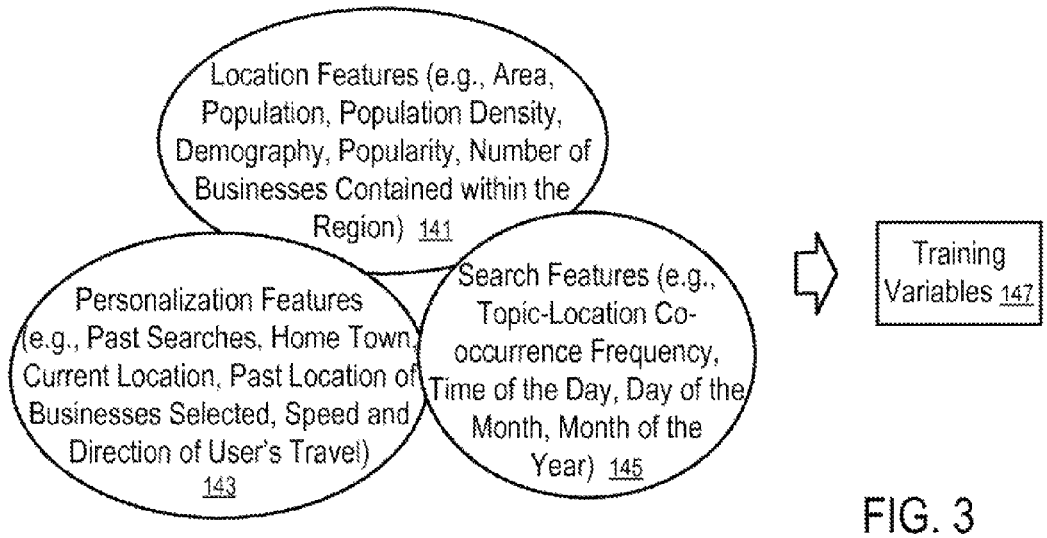
FIG. 3 illustrates training features for a location model according to one embodiment.

FIG. 3 illustrates training features for a location model according to one embodiment. In FIG. 3, the training variables (147) are based on features from one or more of the following categories: location features (141), personalization features (143), and search features (145).

In one embodiment, location features (141) are associated with a given location. In one embodiment, location features (141) for training the location model (127) are independent of prior searches or queries found in a search engine log (e.g., 121). Examples of location features (141) includes area, population, population density, demographic data, popularity, number of businesses contained within the given region, entity feature type, search hits, etc.

In one embodiment, personalization features (143) help personalize a location disambiguation algorithm based on characteristics of searchers (e.g., the submitters of the local searchers or queries). In one embodiment, personalization features (143) for training the location model (127) are dependent upon the searchers of the queries found in the search engine log (e.g., 121). Examples of personalization features (143) include current user location (e.g., as derived from the GPS coordinates or IP address), past searched locations, past locations of the selected businesses by the respective searchers, travel speed and direction of the searchers, interests of the searchers, home town locations of the searchers, etc.

In one embodiment, search features (145) are related to the context of searches. In one embodiment, search features (145) for training the location model (127) are dependent upon the search queries found in the search engine log (e.g., 121). In one embodiment, search features (145) for training the location model (127) are dependent upon the search queries found in the search engine log (e.g., 121) but are independent of the respective searchers submitting the search queries. Examples of search features (145) include co-occurrence frequency of search topic terms and location terms, time of the day, day of the month or week, month of the year, etc.

In one embodiment, the training features include:
the distance between the location candidate and the location of the device that submits the search query;
the number of businesses contained within a given location candidate; and
the number of search hits provided by a search engine for a given location candidate.

For example, when a given location candidate is "San Francisco"+"Calif.," the training features include the distance between the number of businesses in "San Francisco, Calif." and the number of search hits when the term "San Francisco, Calif." is entered in search engine (111) or another search engine. In one embodiment, the search hits provide a general indication about the popularity of the location candidate. Other indicators of popularity can also be used.

Figure 4:
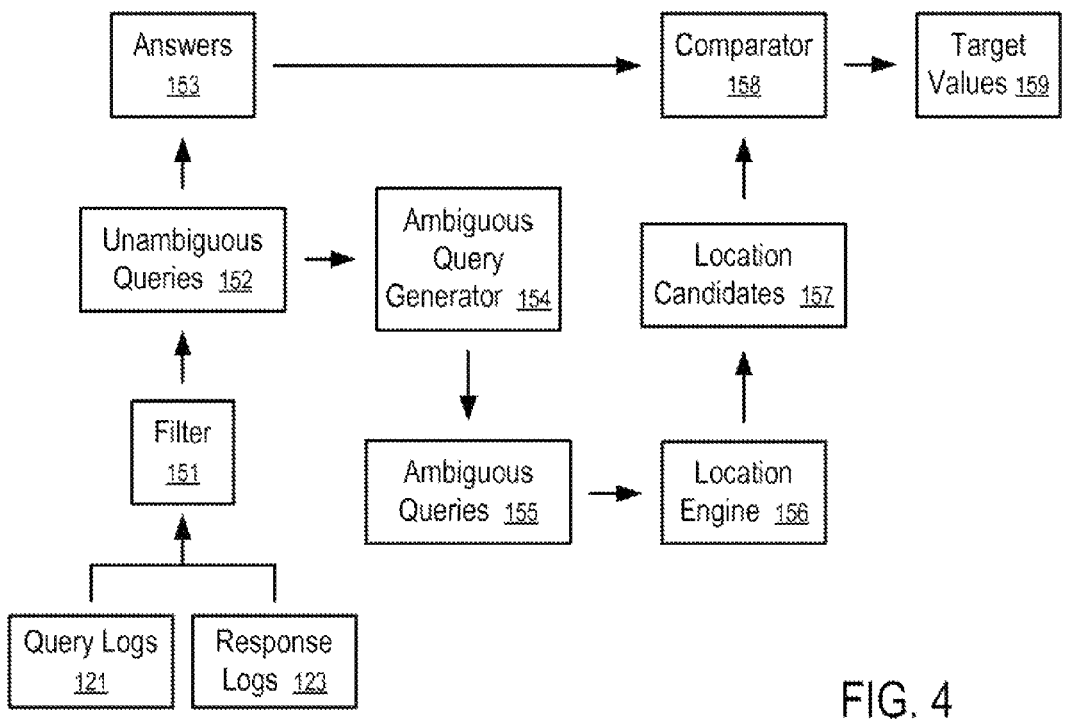
FIG. 4 shows a method and system to generate target values of a training dataset for a location model according to one embodiment.

FIG. 4 shows a method and system to generate target values of a training dataset for a location model according to one embodiment. In one embodiment, the dataset generator (131) of FIG. 2 includes a filter (151), an ambiguous query generator (154), a location engine (156), and a comparator (158).

In one embodiment, the filter (151) identifies the unambiguous queries (152) from the query logs (121) and the response logs (123). In one embodiment, each of the unambiguous queries (152) has results from which the respective searcher has selected at least one item (e.g., a business listing, an advertisement, etc.), where the selection of the item confirms the geographical intent of the query. Thus, the confirmed geographical intent provides the answers (153) to ambiguous queries (155).

In one embodiment, the unambiguous queries (152) are based on queries in the query logs (121) that have unambiguous location references. In one embodiment, some of the unambiguous queries (152) are based on queries in the query logs (121) that have ambiguous location references, where user selections from search results identify the corresponding unambiguous location references.

In FIG. 4, the ambiguous query generator (154) generates the ambiguous queries (155) from the unambiguous queries (152).

In one embodiment, the ambiguous query generator (154) generates the ambiguous queries (155) from the unambiguous queries (152) by removing at least one component of the unambiguous location reference.

For example, in one embodiment, the ambiguous query generator (154) breaks each of the unambiguous location references into two parts: (1) name and (2) state constraint. For example, "San Jose, Calif." is broken into "San Jose" (name) and "Calif." (state constraint). Removing the state constraint provides an ambiguous location reference for the respective ambiguous query (155).

In one embodiment, the location engine (156) identifies a set of location candidates (157) for each of the ambiguous queries (155). In one embodiment, the location engine (156) determines the location candidates (157) based on solely the ambiguous location reference of the corresponding query. In another embodiment, the location engine (156) determines the location candidates (157) based on not only the ambiguous location reference of the corresponding query, but also other elements of the ambiguous query, such as the topic terms. In one embodiment, the location engine (156) ranks the location candidates and provides no more than a predetermined number of top location candidates.

In FIG. 4, the comparator (158) compares the location candidates (157) with the respective answers (153) to generate the target values (159) of a target variable. The training engine (135) trains the location model (127) to optimize the performance of the target variable.

In one embodiment, the query context data (129) includes an indication of whether a query is from a mobile device (e.g., 105 or 106), or from a fixed-location device, such as a desktop device (e.g., 107 or 108).

In one embodiment, the dataset generator (131) generates separate training datasets (e.g., 133) for mobile queries and non-mobile queries and thus generates separate location models (e.g., 127) for mobile queries and non-mobile queries.

In one embodiment, the indication of whether a query is a mobile or non-mobile query is a training feature for establishing a unified location model (127) for both mobile queries and non-mobile queries.

In one embodiment, the location model (127) is based on a decision tree that maps observations about an item (e.g., values of training variables) to conclusions about the item's target value (e.g., values of a target variable).

In a decision tree, leaves represent classifications or predictions; and branches represent conjunctions of features that lead to those classifications. A supervised learning technique, such as those in L. Breiman, J. Friedman, C. J. Stone, and R. Olshen ("Classification and Regression Trees," Chapman and Hall/CRC, 1984) and I. Jenhani, N. B. Amor, and Z. Elouedi ("Decision Trees as Possibilistic Classifiers," International Journal of Approximate Reasoning Vol. 48, No. 3, 2008, pp. 784-807), can learn the decision trees from training data.

In one embodiment, a machine learning technique is to start a decision tree by selecting a root node (decision variable and split point) using purity measures such as information gain or means squared error to select both the variable and split point. Subsequently, the technique adds child nodes until a node becomes pure (consists of one class) or the number of examples reaching that node becomes small. The process of adding nodes generates the decision tree.

The modeling ability of a decision tree can be greatly enhanced through combining multiple decision trees in the form of committees or ensembles of decision trees. One simple example of such an ensemble is to learn multiple decision trees, each one trained on a different subset of the training data (for example). For classification of an unlabeled instance, each tree assigns a class using the usual decision inference strategy. Subsequently, a majority rule assigns the class with the highest number of votes to the example being labeled.

A more principled approach to constructing ensembles of decision trees is stochastic gradient boosted decision trees (GBDT). GBDT is an additive classification (or regression model) consisting of an ensemble of trees, fitted to current residuals (gradient of the loss function), in a forward stepwise manner. In one embodiment, training via GBDT includes fitting an ensemble of decision trees, each of them being trained separately in a sequential manner. Each iteration fits a decision to the residuals left by the classifier of the previous iteration. Prediction is accomplished by adding the predictions of each classifier. Reducing the shrinkage (learning rate) parameter helps prevent over-fitting and has a smoothing effect but increases the learning time. J. H. Friedman ("Greedy Function Approximation: A Gradient Boosting Machine," The Annals of Statistics Vol. 29, No. 5, 2001, pp. 1189-1232; and "Stochastic Gradient Boosting," Computational Statistics & Data Analysis, Vol. 38, No. 4, 2002, pp. 367-378) and T. Hastie, R. Tibshirani, and J. Friedman, ("The Elements of Statistical Learning: Data Mining, Inference, and Prediction," Springer-Verlag, New York, 2001) provide details on GBDT, the disclosures of which are incorporated herein by reference.

Figure 5:
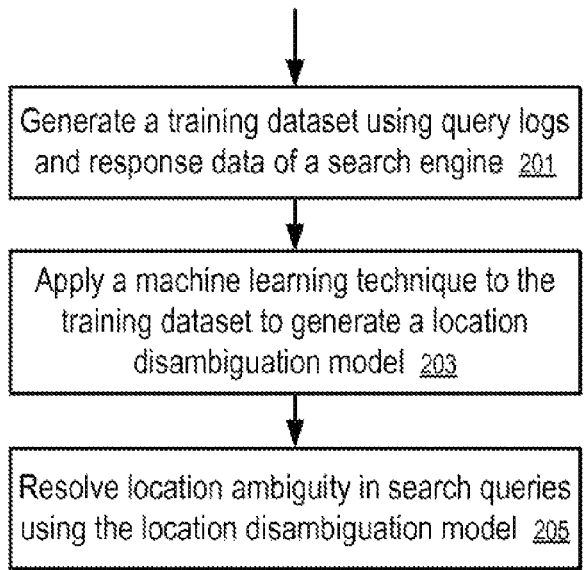
FIG. 5 shows a method to resolve location ambiguity according to one embodiment.

FIG. 5 shows a method to resolve location ambiguity according to one embodiment. In one embodiment, a computing apparatus includes a dataset generator (131), a training engine (135) and a location disambiguation engine (109). The computing apparatus has a configuration for the functionalities of generating (201) a training dataset (133) using query logs (e.g., 121) and response data (e.g., 123) of a search engine (e.g., 111) (e.g., using the dataset generator (131)), applying (203) a machine learning technique to the training dataset (133) to generate a location disambiguation model (e.g., 127) (e.g., using the training engine (135)), and resolving (205) location ambiguity in search queries using the location disambiguation model (127) (e.g., using the location disambiguation engine (109)).

In one embodiment, the computing apparatus further includes the search engine (111) to receive a search query having location ambiguity; and the location disambiguation engine (109) identifies an unambiguous location for the search query to resolve the location ambiguity using the location model (127). The search engine (111) determines a search result corresponding to the search query directed to the unambiguous location and provides the search result as a response to the search query having location ambiguity.

In one embodiment, the machine learning technique includes a decision tree learning technique, such as a gradient boosted decision tree learning technique.

In one embodiment, the training dataset (133) has at least one location feature (141), at least one personalization feature (143), and at least one search feature (145).

In one embodiment, the training dataset (133) has training features including at least one of: location features (141), personalization features (143), and search features (145).

In one embodiment, the location features (141) are independent of queries recorded in the query logs (121), such as area, population, population density, demography, popularity, and business population of a geographic location/area.

In one embodiment, the personalization features (143) are related to searchers of the queries recorded in the query logs (121), such as searcher location, searcher traveling direction, searcher traveling speed, searcher searched location, and location of searcher selected businesses.

In one embodiment, the search features (145) are independent of searchers of the queries recorded in the query logs (121), such as topic-location co-occurrence frequency, and time, day, and month of the searches.

In one embodiment, the training dataset (133) includes training features such as search hit values of the location candidates (157), business count values of the location candidates (157), and distances between the location candidates (157) and the locations of the searchers corresponding to the queries recorded in the query logs (121).

In one embodiment, the computing apparatus includes a filter (151) to filter the query logs (121) to identify first queries (e.g., 152) without location ambiguity, an ambiguous query generator (154) to generate, from the first queries (e.g., 152), second queries (155) having location ambiguity, a location engine (156) to identify location candidates (157) for the second queries (155), and a comparator to compare unambiguous locations (e.g., 153) specified in the first queries (e.g., 152) and corresponding location candidates (157) for the second queries (e.g., 55) to generate training targets (159).

In one embodiment, the computing apparatus includes a data storage device (e.g., 113) to store the query logs (121) and the response logs (123), which are used to generate the training dataset (133).

In one embodiment, the training dataset (133) includes at least one training feature independent of queries recorded in the query logs (121) (e.g., location features (141)) and at least one training feature independent of searchers (e.g., search features (145)).

Figure 6:
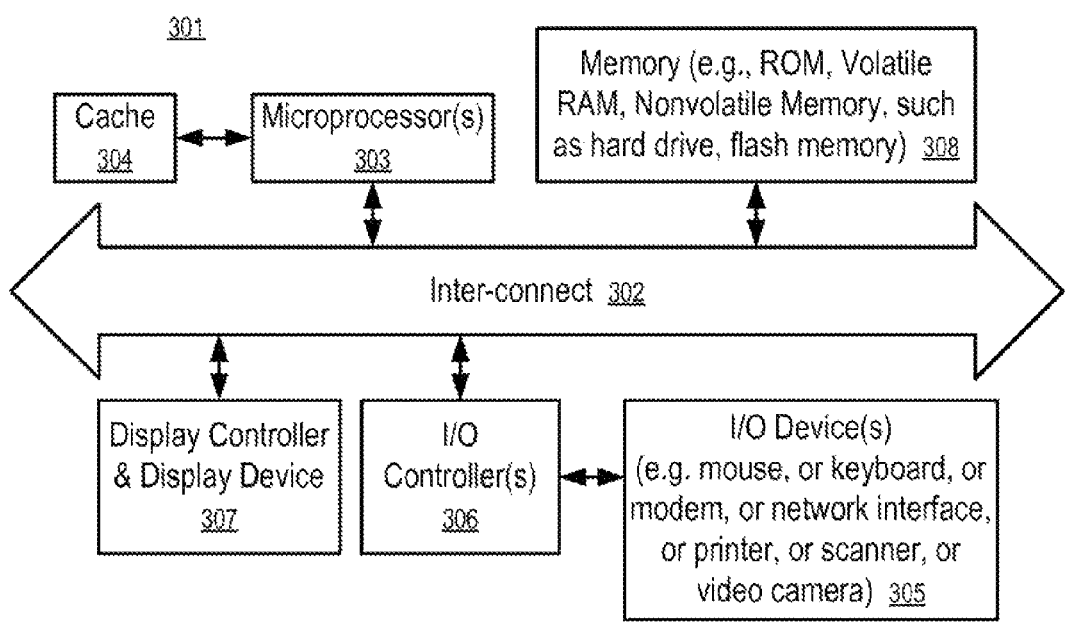
FIG. 6 shows a data processing system to implement components and systems according to various embodiments.

FIG. 6 shows a data processing system to implement various embodiments. While FIG. 6 illustrates various components of a computer system, it is not intended to represent any particular architecture or manner of interconnecting the components. Some embodiments may use other systems that have fewer or more components than those shown in FIG. 6.

In one embodiment, each of the user terminals (e.g., 107, ..., 108), the mobile devices (e.g., 105, ..., 106), the search engine (111), the location disambiguation engine (109), the database (113), the training engine (135), and the dataset generator (131), or their components, such as the filter (151), the ambiguous query generator (154), the location engine (156), the comparator (158) or combinations or subsets, can be a data processing system, with more or less components, as illustrated in FIG. 6.

In FIG. 6, the data processing system (301) includes an inter-connect (302) (e.g., bus and system core logic), which interconnects a microprocessor(s) (303) and memory (308). The microprocessor (303) is coupled to cache memory (304) in the example of FIG. 6.

The inter-connect (302) interconnects the microprocessor(s) (303) and the memory (308) together and also interconnects them to a display controller, a display device (307), and to peripheral devices such as input/output (I/O) devices (305) through an input/output controller(s) (306).

Typical I/O devices include mice, keyboards, modems, network interfaces, printers, scanners, video cameras and other devices which are well known in the art. In some embodiments, when the data processing system is a server system, some of the I/O devices, such as printer, scanner, mice, and/or keyboards, are optional.

The inter-connect (302) may include one or more buses connected to one another through various bridges, controllers and/or adapters. In one embodiment, the I/O controller (306) includes a USB (Universal Serial Bus) adapter for controlling USB peripherals, and/or an IEEE-1394 bus adapter for controlling IEEE-1394 peripherals.

The memory (308) may include ROM (Read Only Memory), volatile RAM (Random Access Memory), and non-volatile memory, such as hard drive, flash memory, etc.

Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data, which when executed by a data processing system, causes the system to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in the same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a tangible machine-readable medium includes any apparatus that provides (e.g., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
receiving, at a computing device from a searcher, a search query having location ambiguity;
generating, by the computing device, a location model using a machine learning technique, the location model generated, at least in part, based on a personalization feature, wherein the personalization feature comprises a location corresponding to a past result selected by the searcher, wherein generating the location model based, at least in part, on the personalization feature comprises generating a training dataset comprising the personalization feature, wherein generating the training dataset comprises
filtering a query log to identify a first query, the first query specifying an unambiguous location,
generating, from the first query, a second query having location ambiguity by removing a first component of the first query, wherein removing the first component comprises
breaking the first query into the first component and a second component, and
removing the first component,
identifying a location candidate for the second query, and
generating a training target based on comparing the unambiguous location specified in the first query and the location candidate for the second query;
identifying, by the computing device using the location model, an unambiguous location for the search query to resolve the location ambiguity; and
determining, by the computing device, a search result corresponding to the search query directed to the unambiguous location for the search query.

2. The method of claim 1, wherein the first component comprises a state and the second component comprises a city.

3. The method of claim 1, wherein the machine learning technique comprises a decision tree learning technique.

4. The method of claim 1, wherein the machine learning technique comprises a gradient boosted decision tree learning technique.

5. The method of claim 1, wherein the training dataset further comprises a location feature and a search feature.

6. The method of claim 5, wherein the location feature is independent of queries recorded in the query log.

7. The method of claim 5, wherein the location feature comprises at least one of: area, population, population density, demography, popularity, or business population.

8. The method of claim 5, wherein the search feature is independent of searchers of the queries recorded in the query log.

9. The method of claim 5, wherein the search feature comprises at least one of: topic-location co-occurrence frequency, time, day, or month.

10. The method of claim 1, wherein the personalization feature is related to searchers of queries recorded in the query log.

11. The method of claim 1, further comprising determining that the search query is received from the searcher via a mobile device,
wherein generating the location model comprises generating a first location model for queries received from mobile devices and generating a second location model for queries received from fixed-location devices, and
wherein identifying the unambiguous location for the search query using the location model comprises identifying the unambiguous location for the search query using the first location model based on the search query being received from the searcher via the mobile device.

12. The method of claim 1, wherein the personalization feature further comprises at least one of: a location of the searcher, a direction being traveled by the searcher, or a speed being traveled by the searcher.

13. A non-transitory computer readable medium storing instructions which, when executed by a computer comprising a processor, cause the computer to perform operations comprising:
receiving a search query having location ambiguity;
generating a location model using a machine learning technique, the location model generated, at least in part, based on a personalization feature, wherein the personalization feature comprises a location corresponding to a past result selected by a searcher, wherein generating the location model based, at least in part, on the personalization feature comprises generating a training dataset comprising the personalization feature, wherein generating the training dataset comprises
filtering a query log to identify a first query, the first query specifying an unambiguous location,
generating, from the first query, a second query having location ambiguity by removing a first component of the first query, wherein removing the first component comprises
breaking the first query into the first component and a second component, and
removing the first component,
identifying a location candidate for the second query, and
generating a training target based on comparing the unambiguous location specified in the first query and the location candidate for the second query;
identifying, using the location model, an unambiguous location for the search query to resolve the location ambiguity; and
determining a search result corresponding to the search query directed to the unambiguous location for the search query.

14. The non-transitory computer readable medium of claim 13, wherein the operations further comprise determining that the search query is received from the searcher via a mobile device,
wherein generating the location model comprises generating a first location model for queries received from mobile devices and generating a second location model for queries received from fixed-location devices, and
wherein identifying the unambiguous location for the search query using the location model comprises identifying the unambiguous location for the search query using the first location model based on the search query being received from the searcher via the mobile device.

15. A system, comprising:
a processor; and
a memory that stores instructions that, when executed by the processor, cause the processor to perform operations comprising
receiving a search query having location ambiguity,
generating a location model using a machine learning technique, the location model generated, at least in part, based on a personalization feature, wherein the personalization feature comprises a location corresponding to a past result selected by a searcher, wherein generating the location model based, at least in part, on the personalization feature comprises generating a training dataset comprising the personalization feature, wherein generating the training dataset comprises
filtering a query log to identify a first query, the first query specifying an unambiguous location,
generating, from the first query, a second query having location ambiguity by removing a first component of the first query, wherein removing the first component comprises
breaking the first query into the first component and a second component, and
removing the first component,
identifying a location candidate for the second query, and
generating a training target based on comparing the unambiguous location specified in the first query and the location candidate for the second query,
identifying, using the location model, an unambiguous location for the search query to resolve the location ambiguity, and
determining a search result corresponding to the search query directed to the unambiguous location for the search query.

16. The system of claim 15, wherein the operations further comprise determining that the search query is received from the searcher via a mobile device,
wherein generating the location model comprises generating a first location model for queries received from mobile devices and generating a second location model for queries received from fixed-location devices, and
wherein identifying the unambiguous location for the search query using the location model comprises identifying the unambiguous location for the search query using the first location model based on the search query being received from the searcher via the mobile device.

* * * * *